United States Patent
Obermarck et al.

(10) Patent No.: US 6,292,808 B1
(45) Date of Patent: *Sep. 18, 2001

(54) METHOD AND APPARATUS FOR REAPPLYING CHANGES TO A DATABASE

(75) Inventors: Ronald Obermarck, Redwood City; Mark H. Johnson, Los Gatos, both of CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/205,830

(22) Filed: Dec. 3, 1998

Related U.S. Application Data

(63) Continuation of application No. 08/768,717, filed on Dec. 18, 1996, now Pat. No. 5,974,425.

(51) Int. Cl.⁷ .................................................. G06F 17/30
(52) U.S. Cl. .............................................. 707/202; 707/8
(58) Field of Search ..................... 707/1–10, 100–104, 707/200–206; 711/117, 3, 113, 154, 159, 133; 714/15; 709/203, 208, 228

(56) References Cited

U.S. PATENT DOCUMENTS

| | | | |
|---|---|---|---|
| 5,278,982 | 1/1994 | Daniels et al. | 707/202 |
| 5,317,731 | 5/1994 | Dias et al. | 707/8 |
| 5,327,556 | 7/1994 | Mohan et al. | 707/8 |
| 5,440,727 | 8/1995 | Bhide et al. | 711/117 |
| 5,455,944 | 10/1995 | Haderle et al. | 707/202 |
| 5,465,328 | 11/1995 | Dievendorff et al. | 714/15 |
| 5,809,527 | * 11/1998 | Cooper | 711/133 |
| 5,832,510 | * 11/1998 | Ito et al. | 707/201 |
| 5,832,511 | * 11/1998 | Beck | 707/201 |
| 5,974,425 | * 10/1999 | Obermarck et al. | 707/202 |

* cited by examiner

*Primary Examiner*—Ruay Lian Ho
(74) *Attorney, Agent, or Firm*—Hickman, Palermo, Truong & Becker LLP; Edward A. Becker

(57) ABSTRACT

A method and apparatus for reapplying changes to a database is disclosed. A recovery log is provided for recording all changes applied to the database so that the changes may be reapplied to the database during database recovery. Whenever a change is written to a storage device, the recovery log is updated to indicate that the particular change has been written to the storage device. During recovery, the data in the recovery log is sorted by file ID, data block ID, record type and version ID.

25 Claims, 8 Drawing Sheets

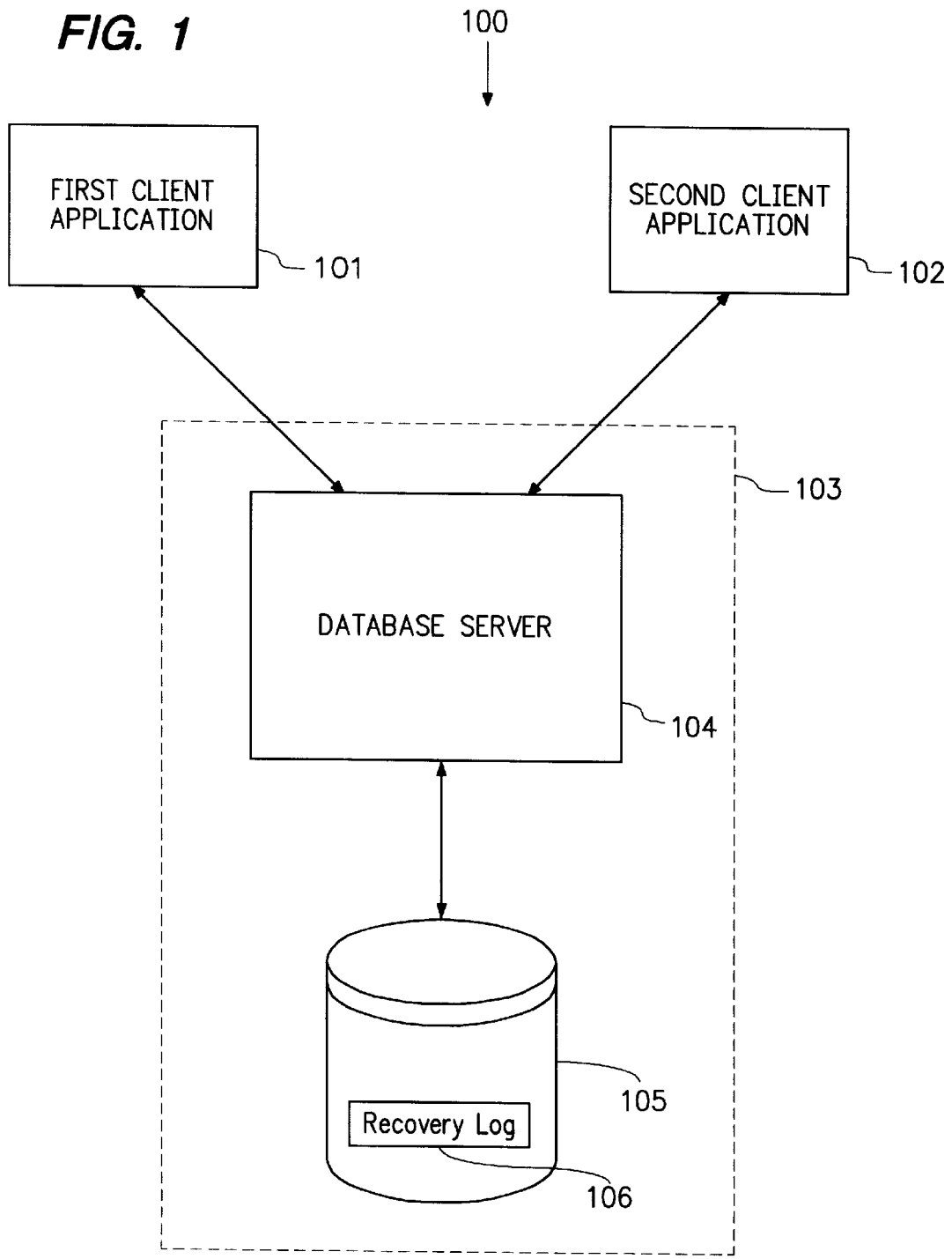

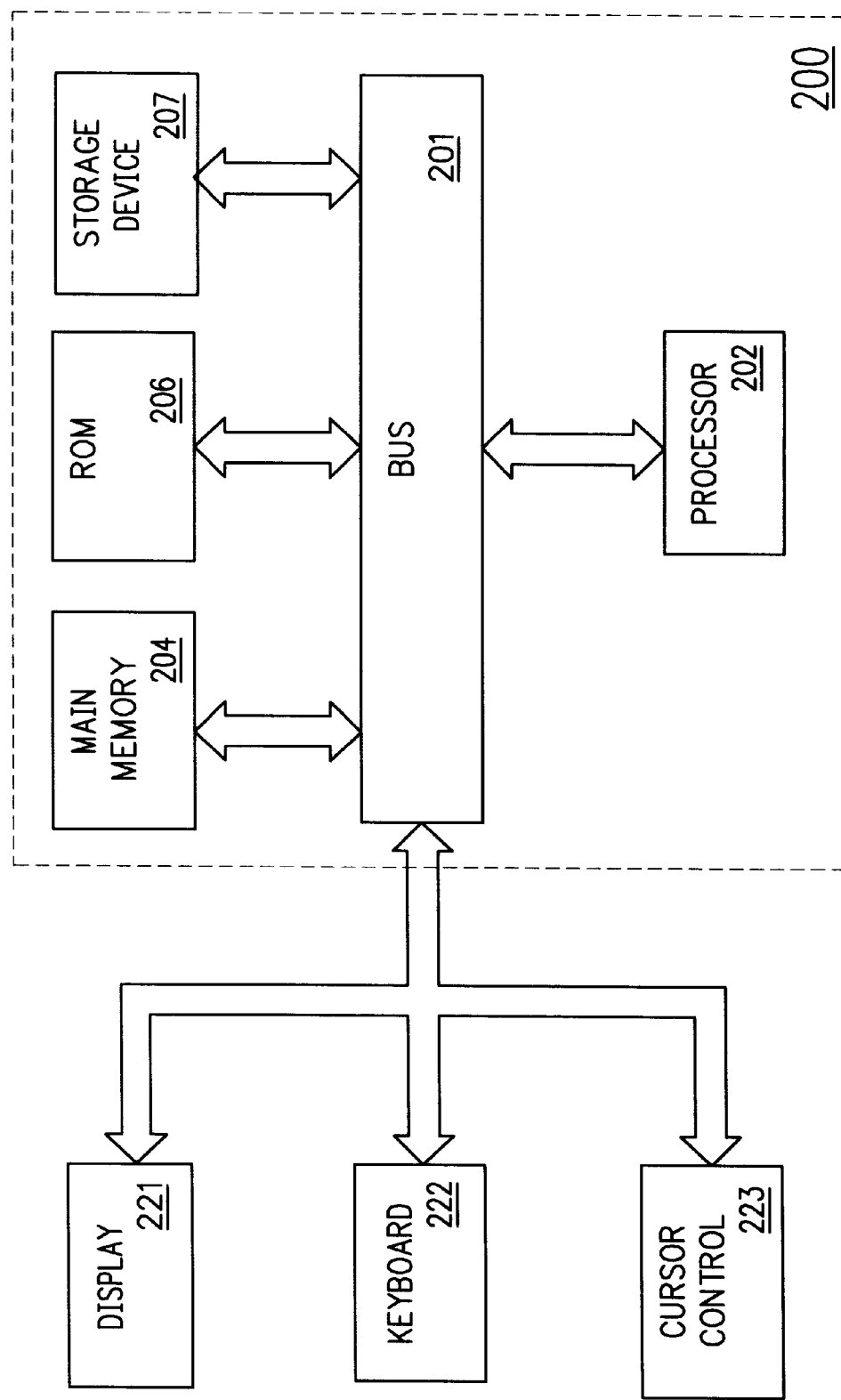

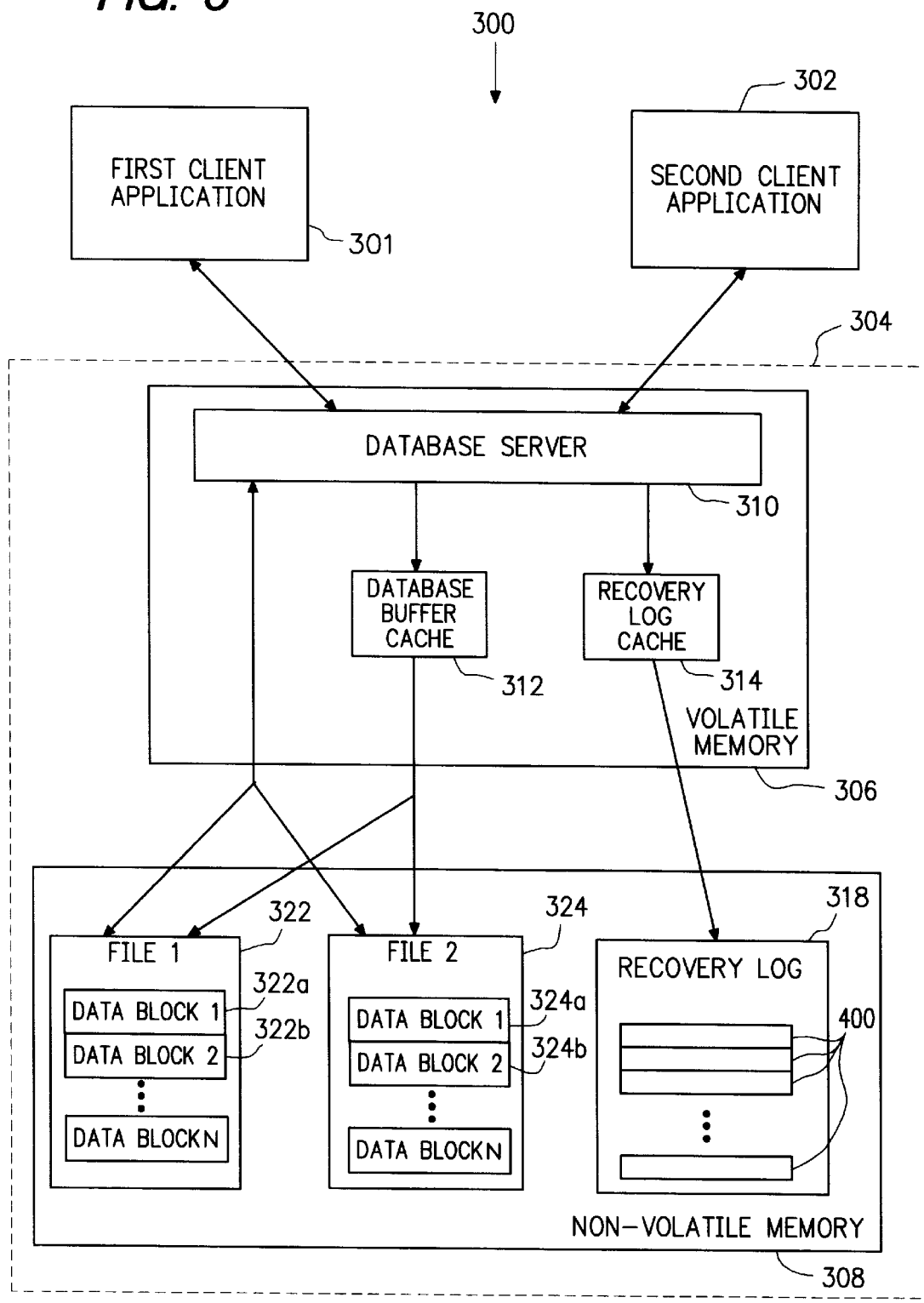

FIG. 4A RECOVERY LOG RECORD

| RECORD TYPE | FILE ID | DATA BLOCK ID | VERSION ID |
|---|---|---|---|
| 404 | 406 | 408 | 410 |

400

FIG. 4B RECOVERY LOG (UNSORTED)

TF1B1(1) | TF1B2(1) | TF2B2(1) | ... | TF2B1(1) | CF1B1(1) | TF2B2(500) | TF1B1(500) | TF2B1(500) | TF1B2(500) | CF2B2(150) | CF1B1(500)

318

FIG. 4C RECOVERY LOG (SORTED BY FILE ID)

FILE 1: TF1B1(1) | ... | CF1B1(1) | TF1B1(500) | CF1B1(500) | TF1B2(500)
FILE 2: TF2B1(1) | TF2B2(1) | ... | TF2B1(500) | TF2B2(500) | CF2B2(150)

318

FIG. 4D RECOVERY LOG (SORTED BY FILE ID, DATA BLOCK ID, RECORD TYPE AND VERSION ID)

FILE 1: TF1B1(1) | CF1B1(1) | TF1B1(500) | CF1B1(500) | TF1B2(1) | TF1B2(500) | ...
FILE 2: TF2B1(1) | TF2B1(500) | TF2B2(1) | TF2B2(500) | CF2B2(150) | TF2B2(500) | ...

METHOD AND APPARATUS FOR REAPPLYING CHANGES TO A DATABASE

This application is a continuation of application Ser. No. 08/768,717 filed Dec. 18, 1996, now U.S. Pat. No. 5,974,425.

FIELD OF THE INVENTION

The present invention relates to databases, and more specifically, to a method and apparatus for reapplying changes to a database.

BACKGROUND OF THE INVENTION

Updates to databases are often made by changing data stored in dynamic memory and then writing the changed data to disk at a later time. However, in every database system, the possibility of a system or hardware failure always exists. Such failures can corrupt or destroy changes made to data in dynamic memory before the changed data has been written to disk, leaving the database in an inconsistent state. Even after changed data has been written to disk, media failures can corrupt or destroy portions of a database containing the changed data.

To address the risk of losing changed data not yet written to disk, some contemporary databases maintain a recovery log containing a record of all changes made against the database. The recovery log typically consists of one or more files stored on disk which contain sufficient information about the changes so that in the event of a failure, the changes that were lost during the failure may be made against the database again. Hence, the recovery log provides a recovery mechanism for restoring the consistency of a database in the event of a failure.

Consider the simple database arrangement 100 depicted in FIG. 1. A first client application 101 and a second client application 102 submit changes to a database system 103. The database system 103 includes a database server 104 and non-volatile storage 105. The database server 104 processes database changes submitted by the first and second client applications 101, 102 and accesses non-volatile storage 105 which stores the database files. The database system 103 also includes a recovery log 106 which resides on non-volatile storage 105 and contains sufficient information about all of the changes submitted to the database system 103 by the client applications 101 and 102, so that in the event of a failure, the changes may be resubmitted from recovery log 106.

Because a failure may occur at any time, it is not known which changes have actually been written to non-volatile storage 105. Therefore, during recovery, data blocks on the non-volatile storage 105 must be checked to determine whether the data block reflects the changes recorded in the recovery log 106. According to one approach, this determination is performed by reading a version identifier that indicates the stored version of each referenced data block and comparing the version identifier to a corresponding version identifier stored in the recovery log 106. If the version identifier associated with the change contained in the recovery log 106 is newer than the version identifier associated with the data block stored on non-volatile storage 105, then the change was never applied to the data block stored in the non-volatile storage 105 and must be reapplied. On the other hand, if the version identifier associated with the data block stored on non-volatile storage 105 is at least as recent as the version identifier associated with the change contained in the recovery log 106, then the change does not need to be reapplied.

For changes affecting many data blocks, this process becomes quite time consuming. Moreover, the changes are stored in the recovery log 106 in chronological order. Accessing the data blocks in the database files based upon the chronological order of the changes in the recovery log 106 results in random disk I/O, which is relatively inefficient due to the amount of seek time consumed during the read. This is because the data blocks are sometimes written in different orders.

In view of the need to reapply changes to a database after a system or hardware failure, and the limitations associated with existing approaches, a method and apparatus for reapplying changes to a database to further reduce database recovery time is highly desirable.

SUMMARY OF THE INVENTION

A method and apparatus are provided for reapplying changes to a database. According to one aspect of the present invention, a method is provided for allowing a change to data to be reflected in a database after a failure. A first recovery record is generated which is indicative of the change applied to a copy of the data from the database which is stored in volatile storage. The recovery record is then stored in non-volatile storage. If the copy of data is stored to the non-volatile storage before the failure, then a second recovery record is generated which indicates that the copy of data was stored to the non-volatile storage. The second recovery record is then also stored to the non-volatile storage.

According to another aspect of the present invention, a method is provided for ensuring that a change is reflected in a database. First, a recovery log is created on non-volatile storage which contains sufficient information about the change applied to a first copy of data residing in volatile storage so that the change may be reapplied to a second copy of the data residing in the non-volatile storage. Then a determination is made as to whether the first copy of the data has been written to the non-volatile storage. If the first copy of the data has been written to the non-volatile storage, then the recovery log is updated to indicate that the change does not need to be reapplied to the second copy of the data residing in the non-volatile storage. However, if the change needs to be reapplied, then the change is reapplied to the second copy of the data residing in the non-volatile storage.

According to another aspect of the present invention, a method is provided for ensuring that changes are reflected in a database. The method includes the steps of sorting change information contained in a recovery log and reapplying the changes to the database based upon the sorted change information contained in the recovery log.

According to yet another aspect of the present invention, a system is provided for ensuring that a change is reflected in a database. The system includes one or more nodes, a recovery log residing on the one or more nodes which contains sufficient information about the change so that the change may be reapplied to the database and means for updating the recovery log.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram illustrating a database system incorporating a recovery log;

FIG. 2 illustrates a block diagram of a computer system on which the present invention may be implemented;

FIG. 3 illustrates a block diagram of a database system according to an embodiment of the present invention;

FIG. 4A illustrates the contents of a recovery log record illustrated in FIG. 3;

FIG. 4B illustrates the contents of the recovery log illustrated in FIG. 3;

FIG. 4C illustrates the contents of the recovery log of FIG. 4B after being sorted, according to an embodiment of the present invention;

FIG. 4D illustrates the contents of the recovery log illustrated in FIG. 4C after being further sorted, according to an embodiment of the present invention;

DETAILED DESCRIPTION OF THE PREFERRED EMBODIMENT

Figure 5A:
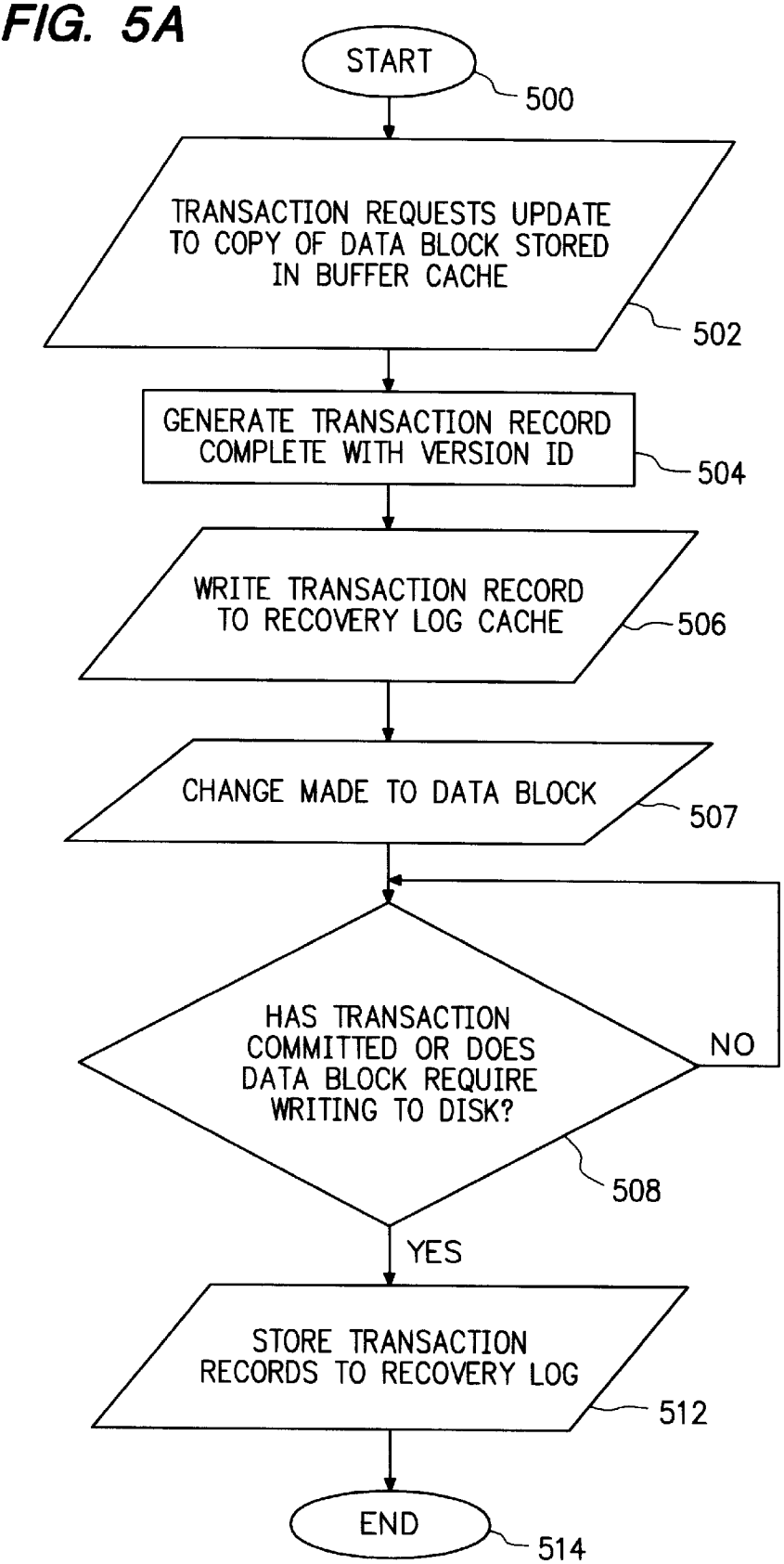
FIGS. 5A and 5B are flow charts illustrating a method for updating a recovery log according to an embodiment of the present invention.

A method and apparatus for reapplying changes to a database is described. In the following description, for the purposes of explanation, numerous specific details are set forth in order to provide a thorough understanding of the present invention. It will be apparent, however, to a person of ordinary skill in the art that the present invention may be practiced without these specific details. In other instances, well-known structures and devices are shown in block diagram form in order to avoid unnecessarily obscuring the present invention.

HARDWARE OVERVIEW

FIG. 2 illustrates a block diagram of a computer system 200 upon which an embodiment of the present invention may be implemented. Computer system 200 includes a bus 201 or other communication mechanism for communicating information, and a processor 202 coupled with bus 201 for processing information. Computer system 200 further comprises a random access memory (RAM) or other dynamic storage device 204 (referred to as main memory), coupled to bus 201 for storing information and instructions to be executed by processor 202. Main memory 204 also may be used for storing temporary variables or other intermediate information during execution of instructions by processor 202. Computer system 200 also includes a read only memory (ROM) and/or other static storage device 206 coupled to bus 201 for storing static information and instructions for processor 202. A data storage device 207, such as a magnetic disk or optical disk, is coupled to bus 201 for storing information and instructions.

Computer system 200 may also be coupled via bus 201 to a display device 221, such as a cathode ray tube (CRT), for displaying information to a computer user. An alphanumeric input device 222, including alphanumeric and other keys, is typically coupled to bus 201 for communicating information and command selections to processor 202. Another type of user input device is cursor control 223, such as a mouse, a trackball, or cursor direction keys for communicating direction information and command selections to processor 202 and for controlling cursor movement on display 221. This input device typically has two degrees of freedom in two axes, a first axis (e.g., x) and a second axis (e.g., y), which allows the device to specify positions in a plane.

Alternatively, other input devices such as a stylus or pen may be used to interact with the display. A displayed object on a computer screen may be selected by using a stylus or pen to touch the displayed object. The computer detects the selection by implementing a touch sensitive screen. Similarly, a light pen and a light sensitive screen may be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 222 wherein all interface is provided via the stylus as a writing instrument (like a pen) and the written text is interpreted using optical character recognition (OCR) techniques.

The present invention is related to the use of computer system 200 for reapplying changes to a database. According to one embodiment, the changes are reapplied to the database by computer system 200 in response to processor 202 executing sequences of instructions contained in memory 204. Such instructions may be read into memory 204 from another computer-readable medium, such as storage device 207. Execution of the sequences of instructions contained in memory 204 causes processor 202 to perform the process steps that will be described hereafter. In alternative embodiments, hard-wired circuitry may be used in place of or in combination with software instructions to implement the present invention. Thus, the present invention is not limited to any specific combination of hardware circuitry and software.

FUNCTIONAL OVERVIEW

Reapplying changes to a database according to the present invention involves creating a recovery log, updating the recovery log whenever new changes are made to the database or previous changes are written to disk, and sorting the recovery log during recovery to minimize the time required to reapply the changes not yet written to disk.

CREATING AND UPDATING THE RECOVERY LOG

In general, a recovery log is created which contains information about each change made to the database. As changes are written to disk, additional information is added to the recovery log to indicate that those changes have been written to disk and therefore do not need to be reapplied during recovery, except to rebuild the database after a media failure.

FIG. 3 illustrates an embodiment of the present invention which is generally indicated by reference numeral 300. First and second client applications 301 and 302 retrieve data from and submit changes to a database system 304. Database system 304 includes a volatile memory 306 and a non-volatile memory 308.

The volatile memory 306, which is a RAM or other volatile memory, includes a database server 310, a database buffer cache 312 and a recovery log cache 314. Database server 310 is a process executing in volatile memory 306 while database buffer cache 312 and recovery log cache 314 are designated storage areas within the volatile memory 306. On the other hand, non-volatile memory 308 includes one or more non-volatile storage devices such as disks which store the data files comprising the database as described in more detail below. For simplicity, non-volatile memory 308 is hereinafter referred to as disk 308.

The first and second client applications 301, 302 request data and submit changes to database server 310. Database server 310 reads data blocks to be updated from non-volatile memory 308 into database buffer cache 312 where the changes are applied to the data blocks. The updated or changed data blocks are then periodically written from database buffer cache 312 back into data files in non-volatile memory 308. However, while residing in database buffer cache 312, data blocks are susceptible to corruption or complete loss in the event of a failure.

To provide for the reapplication of lost changes, a recovery log 318 is maintained on disk 308 and contains a record of all changes submitted to database server 310, regardless of whether or not those changes were actually applied to data blocks on disk 308. Recovery log 318 includes enough information so that during a recovery, any of the previously submitted changes may be reapplied by the database server 310. Portions of recovery log 318 are stored in a recovery log cache 314 and then periodically written to recovery log 318.

Recovery log 318 contains two types of records 400, transaction records and confirmation records. Transaction records contain information about a change applied to a data block in the database buffer cache 312, regardless of whether the changed data block was actually written to disk 308. Confirmation records confirm that a particular data block version has been successfully written to disk 308. During recovery, those changes which have a corresponding confirmation record in recovery log 318 will not have to be reapplied since they have been written to disk 308, significantly reducing recovery time.

As illustrated in FIG. 4A, each record 400 includes a record type field 404, a file ID field 406, a data block ID field 408 and a version ID field 410. The record type field 404 indicates whether the record is a transaction record "T", or a confirmation record "C". The file ID field 406 identifies the specific file to which the change applies, while the data block ID field 408 identifies the specific data block to which the change applies. Finally, the version ID field 410 contains a version identification associated with a particular version of a data block written to disk. More specifically, the version ID is an attribute which allows a determination to be made regarding the chronological order of changes within a data block. Transaction records also contain data (not illustrated) that specifies the change.

FIG. 4B illustrates the contents of recovery log 318 of FIG. 3. With reference to FIGS. 3, 4A and 4B, transaction record 412 indicates that a change, having a version identifier of 1 ("change1"), has been applied to block1 322a of file1 322. Similarly, transaction record 414 indicates that change1 has been applied to block 2 324b of file2 324. As illustrated in FIG. 4B, additional records 400 are written to recovery log 318 in chronological order as changes are made to data blocks.

As previously mentioned, once confirmation has been received that a changed data block has actually been written to disk 308, a confirmation record 400 is created and stored in recovery log 318 so that during recovery, that change will not have to be reapplied to the data block. For example, again referring to FIG. 4B, confirmation record 416 indicates that change1 for block1 322a has been written to disk 308. Consequently, during a recovery operation block1 322a will not need to be read from disk 308 to determine whether or not change1 was written to disk 308, because the confirmation record 416 already confirms this.

GENERATING AND STORING A TRANSACTION RECORD

FIG. 5A is a flow chart illustrating the steps for creating a transaction record 400 and storing the record 400 in recovery log 318. After starting in step 500, a transaction being processed by database server 310 requests an update to a copy of a data block stored in buffer cache 312 in step 502. A transaction record 400 is generated in step 504. In step 506, the transaction record 400 is written to recovery log cache 314 followed by the actual modification of the data block in buffer cache 312 in step 507.

In step 508, a determination is made as to whether the transaction causing the update to the data block has committed. Step 508 is repeated until the transaction commits or until the data block needs to be written to disk, by which time transaction record 400 is written to recovery log 318 in step 512. The transaction records 400 stored in recovery log cache 314 are written to recovery log 318 periodically according to a logical order. Accordingly, transaction records 400 may be written to recovery log 318 individually or in groups. In step 514 the steps for creating a transaction record 400 and storing the transaction record in recovery log 318 are complete.

GENERATING AND STORING A CONFIRMATION RECORD

Figure 5B:
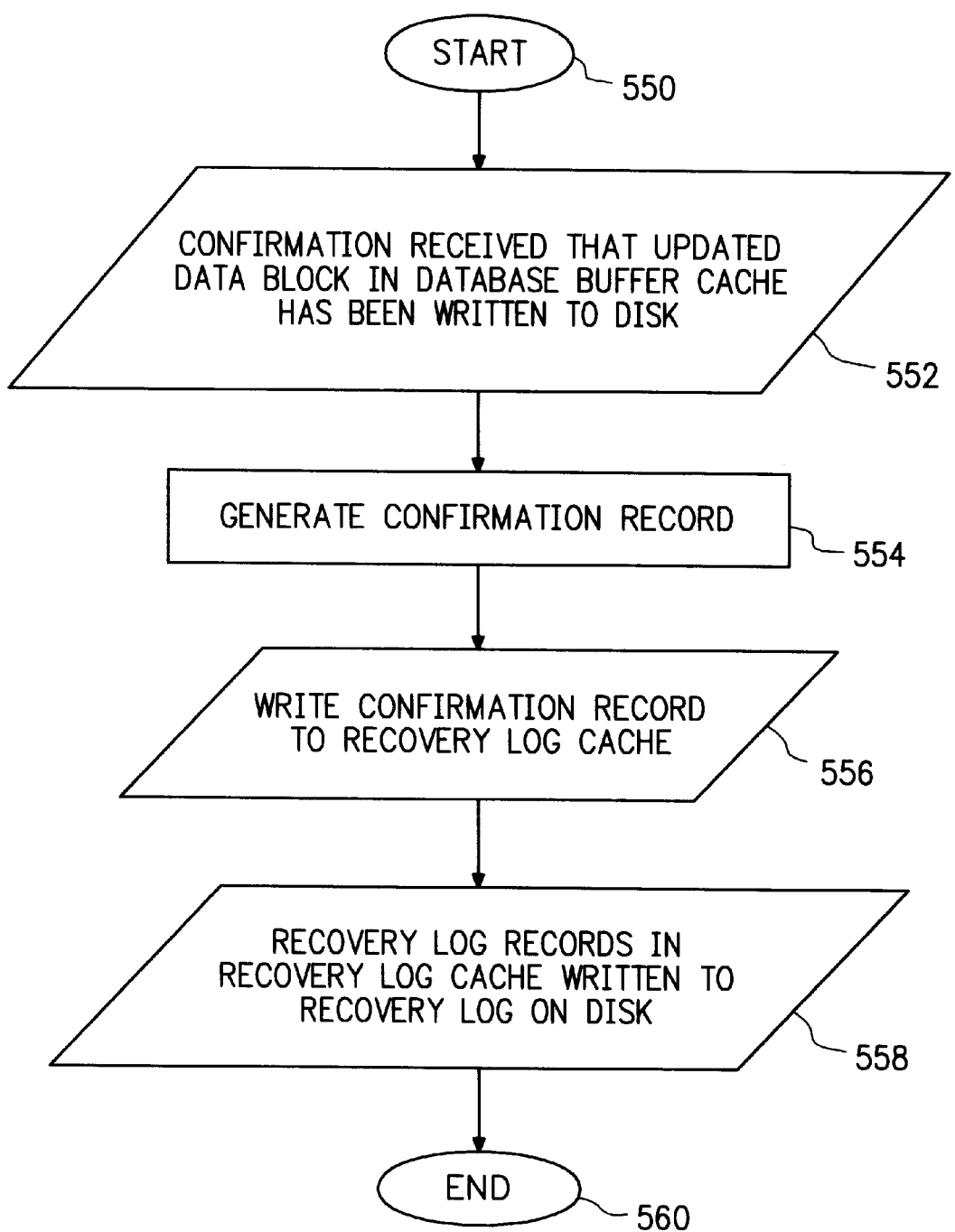

FIG. 5B is a flow chart illustrating the steps for creating a confirmation record 400 and storing the confirmation record 400 in recovery log 318. After starting in step 550, confirmation is received in step 552, that an updated data block in database buffer cache 312 has been written to disk 308. In step 554 a confirmation record is generated to record the writing of the updated data block to disk 308. In step 556 the confirmation record 400 is written to recovery log cache 314. At some time later, the confirmation record 400 along with other confirmation records 400 contained in recovery log cache 314 are written to recovery log 318 on disk 308. The steps for creating a confirmation record 400 and storing confirmation record 400 in recovery log 318 are then completed in step 560.

SORTING THE RECOVERY LOG DURING RECOVERY

Notwithstanding the reduction in recovery time provided by including confirmation records in the recovery log, further reductions in recovery time are achieved by sorting the recovery log records 400 to optimize disk I/O. Since the records 400 are arranged chronologically in recovery log 318, and not by data block location, the data blocks associated with records 400 that are in close proximity to each other in recovery log 318 are typically not adjacent on disk 308 and may not even be located on the same disk 308. Consequently, reapplying the changes based on their chronological order in recovery log 318 results in random disk I/O.

Hence, according to another aspect of the present invention, recovery log 318 records 400 are sorted during recovery according to: (1) file ID; (2) data block ID; (3) record type; and (4) version ID. As illustrated in FIG. 4C, sorting the records 400 by file ID groups the records associated with File1 together and those records associated with File2 together. Since an entire data file is usually stored on a single disk 308, several data blocks for the same data file can be written simultaneously together. Moreover, by ordering the changes by data block, the disk head can be moved across the disk in a single direction, further reducing write time.

FIG. 4D illustrates recovery log 318 after the records 400 have further been sorted by data block ID, record type and version ID. As a result, confirmation record 418 for change 500 to data block1 is arranged first in recovery log 318 followed by confirmation record 416 for change 1 to data block1. Following confirmation records 418, 416, the transaction records 322a for data block1 of File1 322, are arranged in ascending order.

According to an embodiment of the present invention, confirmation records 418, 416 for data block1 322a are sorted by version ID 410 in descending order so that the confirmation record 418 associated with the most recent version of the data block written to disk appears before the other confirmation records 400 for data block1 322a. When sorted in this order, all subsequent confirmation records 416 for data block1 322a are ignored during recovery. More importantly, all of the transaction records 412 through 420 (changes 1 through 500) for data block1 322a are also ignored since these changes must have been already written to disk 308. According to another embodiment of the present invention, confirmation records 400 are sorted in ascending order along with transaction records 400. This sort can be done incrementally while more recent portions of the recovery log are being read or transferred. Then, during recovery, all of the confirmation records 400 associated with a data block are scanned to identify the last confirmation record (containing the most recent change) for that data block on disk 308.

Although embodiments of the present invention have been described in the context of sorting the confirmation records, the present invention is also applicable to other schemes for ordering the data blocks by file ID and data block ID so that the changes can be applied in proper sequence.

Returning to FIG. 4C, since there are no confirmation records 400 for data block2 322b of File1 322, changes 1 through 500 for data block2 322b (records 422 through 424) must be reapplied to data block2 322b in chronological order. Similarly, no confirmation records 400 are included in recovery log 318 for data block1 324a of File2 324. Therefore, in the event of a failure, all of the changes to data block1 324a (transaction records 426 through 428) must be reapplied. However, for data block2 324b of data file2 324,, confirmation record 430 indicates that changes 1 through 150 have been written to disk 308. Therefore, only changes 151 through 500 must be reapplied.

Figure 6A:
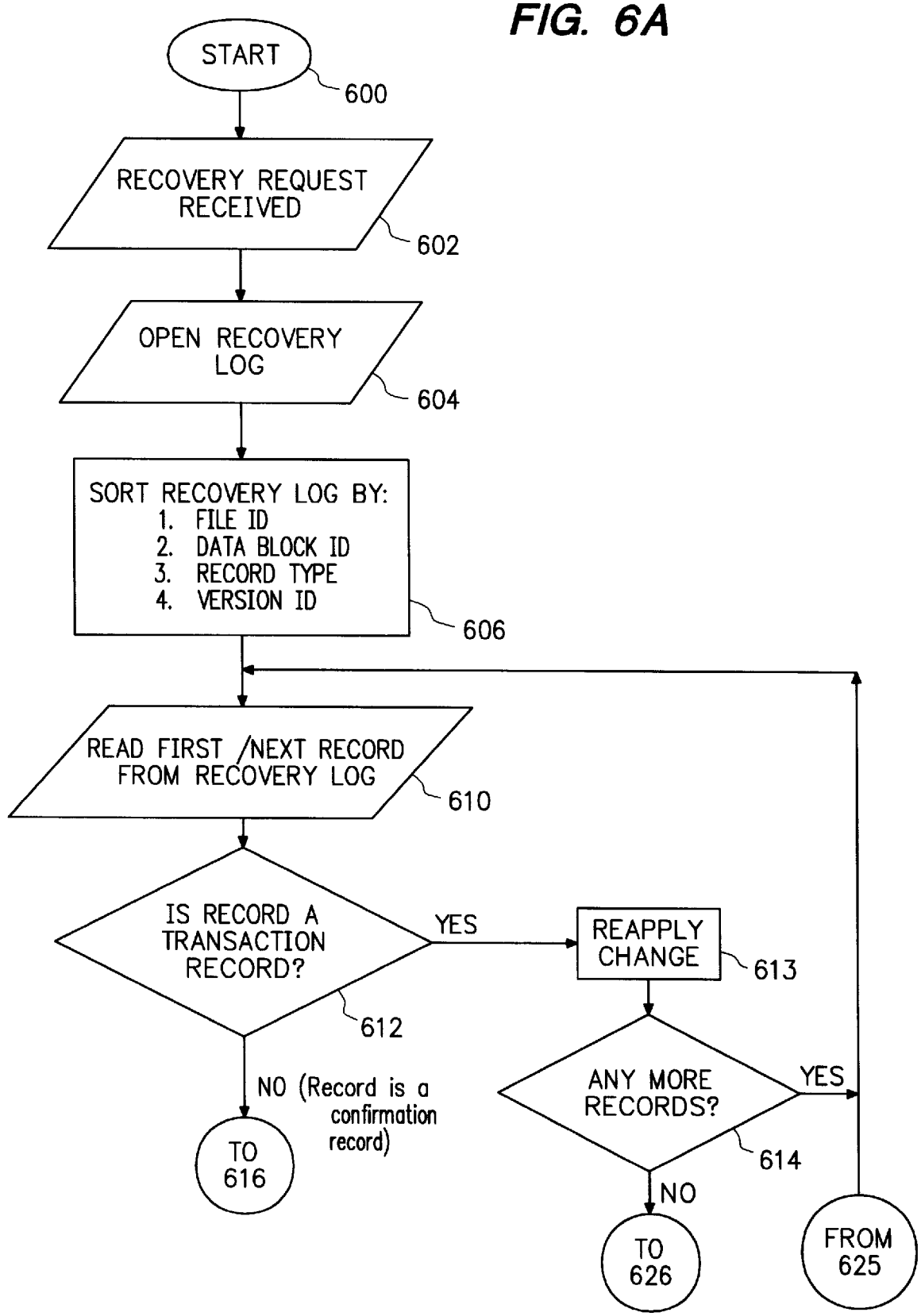
FIGS. 6A and 6B are a flow chart of a method for reapplying changes to a database according to an embodiment of the present invention.
Figure 6B:
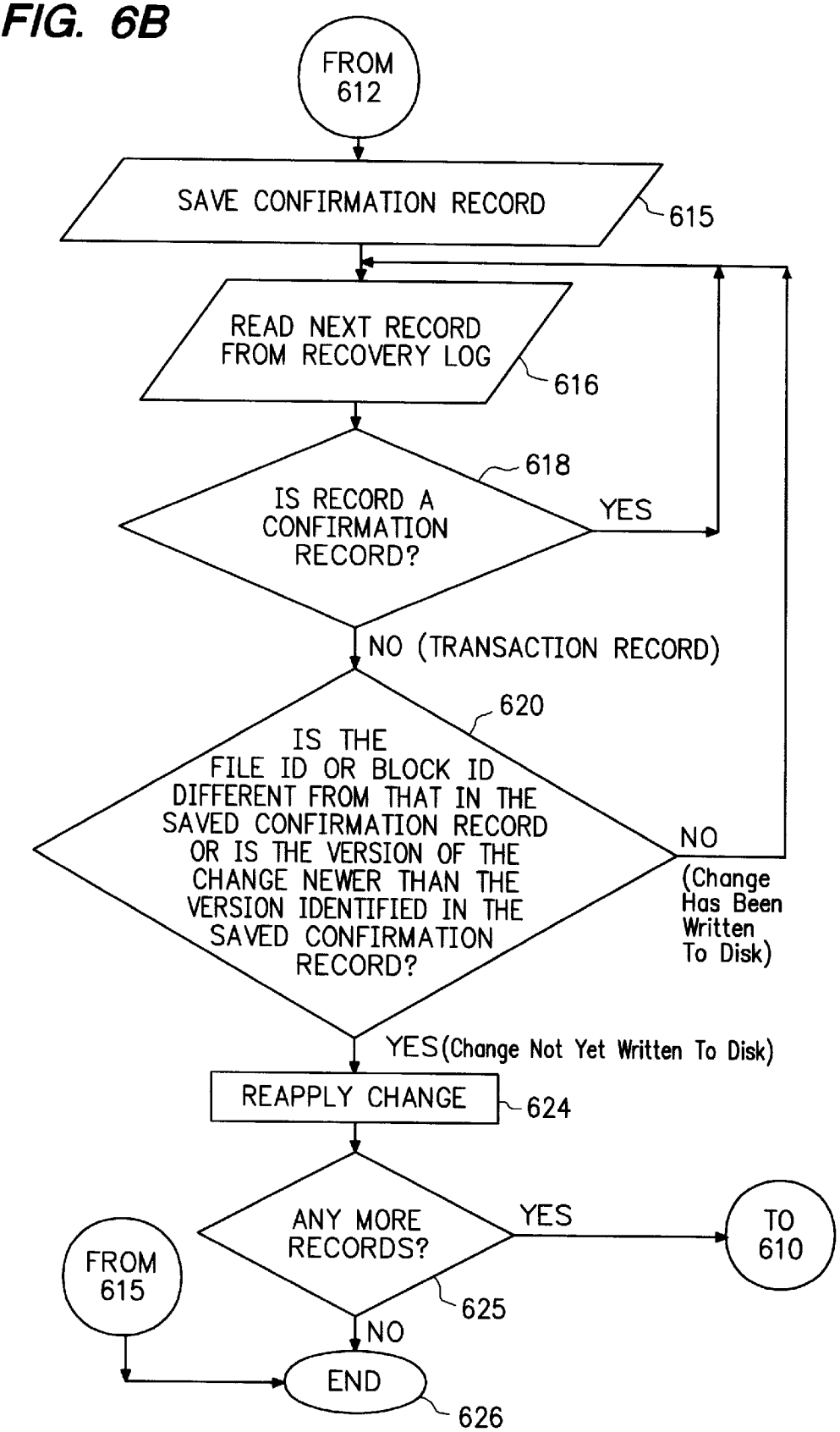

FIGS. 6A and 6B illustrate the specific steps involved in sorting recovery log 318 and then using recovery log 318 to reapply changes to database 303 during a recovery process. After starting in step 600, in step 602 a recovery request is received. Upon receiving the recovery request in step 602, recovery log 318 is opened in step 604. In step 606 recovery log 318 is sorted by: 1) file ID; 2) data block ID; 3) record type; and 4) version ID, as previously described above and as illustrated in FIGS. 4B, 4C and 4D.

Then in step 610 the first record 400 is read from recovery log 318. In step 612, the record type field 404 of the first record 400 is examined to determine whether record 400 is a transaction record. If it is determined that record 400 is a transaction record, then the writing to disk 308, 310, 312 of the change associated with this particular record has not yet been confirmed since, after the sorting of recovery log 318, a confirmation record 400 would have preceded the transaction record 400.

Therefore, in step 613, the change is reapplied to database 303 and in step 614 a test of recovery log 318 is performed to determine whether recovery log 318 contains any additional records 400. If recovery log 318 contains additional records 400, then in step 610 the next record 400 is read from recovery log 318. Steps 610–614 provide for the reapplication of changes recorded in recovery log 318 which do not have a corresponding confirmation record confirming that the changes have been written to disk 308, 310, 312. Accordingly, steps 610–614 are repeated until, in step 612, it is determined that the last record 400 read from recovery log 318 is not a transaction record, but a confirmation record.

The confirmation record is then saved in step 615 and in step 616 the next record 400 is read from recovery log 318. If the next record 400 is another confirmation record 400, then this record 400 is ignored and the next record 400 read from recovery log 318 in step 616. Subsequent confirmation records 400 are ignored because confirmation records 400 were previously sorted in descending order. Therefore, only the first confirmation record 400 for a particular data block is important. This mechanism assures that there will be a transaction record for every confirmation record. For situations where there is not a transaction record for every confirmation record, additional comparisons would be required.

If, on the other hand, in step 618 it is determined that the record 400 read is not a confirmation record and instead is a transaction record, then in step 620 a comparison is made between file ID 406 and block ID 408 contained in transaction record 400 just read and file ID 406 and block ID 408 in the saved confirmation record. The version of the transaction record is also compared to the version of the saved confirmation record. Those transaction records 400 having version IDs 410 indicating a more recent change than the change contained in confirmation record 400, or not having a corresponding confirmation record need to be reapplied. However, during a rebuilding of a database after a media failure, the confirmation records are simply ignored and all of the changes reapplied.

If in step 620 it is determined that the file ID and block ID associated with transaction record 400 is the same as the file ID and data block ID of the saved confirmation record and the change associated with the transaction record 400 is the same as or older than the change in the confirmation record, then the change associated with this transaction record 400 has already been written to disk 308 and is ignored. Accordingly, the next record 400 is read from recovery log 318 in step 616. By ignoring those changes which are older than the last change written to disk 308, as indicated by the confirmation record, the data blocks associated with those changes do not have to be read from disk 308, providing a significant time savings during the recovery process.

Returning back to step 620, if it is determined that the change referenced in transaction record 400 is for a different file ID or block ID as indicated by confirmation record 400, or is newer than the change identified by confirmation record 400, then the change referenced in transaction record 400 has not yet been written to disk 308. Therefore, in step 624 the change associated with confirmation record 400 is reapplied to database 303 and in step 625, recovery log 318 is examined to determine whether any additional records 400 are available. If in step 625, it is determined that more records 400 are available in recovery log 318, then the process continues with step 610. Otherwise, the process is completed in step 626. If instead of confirmation records 400 being sorted by version ID in descending order, they are sorted in ascending order along with the confirmation records, then all of the confirmation records 400 for a particular data block are read and the confirmation record 400 indicating the most recent change used to determine which changes are to be reprocessed.

The approach for reapplying changes to a database according to the present invention provides significant performance advantages over prior approaches. First, by providing confirmation records 400 in recovery log 318 identifying those changes which have been written to disk 308, many data blocks will not have to be read from disk 308 to determine whether the changes contained in recovery log 318 have been written to disk 308. Furthermore, sorting recovery log 318 by file ID 406, data block ID 408, record type 404 and version ID 410 optimizes disk I/O to provide skip-sequential disk access, providing further reductions in recovery time.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for allowing a first change applied to a copy of data from a database to be reflected in the database after a failure, the method comprising the computer-implemented steps of:

generating, in response to the first change being applied to the copy of data from the database, a first transaction record that specifies the first change that has been applied to the copy of data, wherein the copy of data resides in volatile storage;

storing the first transaction record in a recovery log; and in response to the copy of data with the applied first change being stored to a non-volatile storage before the failure, performing the steps of generating a first confirmation record indicating that the copy of data with the applied first change was stored to the non-volatile storage before the failure, and storing the first confirmation record in the recovery log.

2. The method of claim 1, further comprising, after the failure, performing the steps of:

determining whether the recovery log contains the first confirmation record, and only reapplying the first change to the database if the recovery log does not contain the first confirmation record.

3. The method of claim 1, further comprising the steps of:

generating, after a plurality of other changes have been applied to the copy of data, a plurality of transaction records that specify the plurality of other changes that have been applied to the copy of data, storing the plurality of transaction records in the recovery log, and if the copy of data with the plurality of other changes is stored to a non-volatile storage before the failure, generating a plurality of confirmation records associated with the plurality of confirmation records to indicate that the copy of data with the plurality of other changes was stored to the non-volatile storage before the failure, and storing the plurality of confirmation records in the recovery log.

4. The method of claim 3, further comprising, after the failure, performing the steps of:

determining whether the recovery log contains either the first confirmation record or the plurality of confirmation records, only reapplying the first change to the database if the recovery log does not contain the first confirmation record, and only reapplying the plurality of other changes to the database if the recovery log does not contain the plurality of confirmation records.

5. The method of claim 4, wherein the step of reapplying the other changes to the database includes the steps of:

sorting the plurality of transaction records to create a sorted plurality of transaction records, the sorting of the plurality of transaction records being based upon locations in the database where the plurality of other changes are to be reapplied, and reapplying the sorted plurality of other changes to the database.

6. The method of claim 5, wherein:

each of the plurality of transaction records specifies a file identifier and a data block identifier associated with one of the plurality of other changes, and the step of sorting the plurality of transaction records is based upon the file identifiers and data block identifiers specified by the plurality of transaction records.

7. A computer-readable medium carrying one or more sequences of one or more instructions for allowing a first change applied to a copy of data from a database to be reflected in the database after a failure, the one or more sequences or one or more instructions including instructions which, when executed by one or more processors, cause the one or more processors to perform the steps of:

generating, in response to the first change being applied to the copy of data from the database, a first transaction record that specifies the first change that has been applied to the copy of data, wherein the copy of data resides in volatile storage;

storing the first transaction record in a recovery log; and in response to the copy of data with the applied first change being stored to a non-volatile storage before the failure, performing the steps of generating a first confirmation record indicating that the copy of data with the applied first change was stored to the non-volatile storage before the failure, and storing the first confirmation record in the recovery log.

8. The computer-readable medium of claim 7, further including instructions for, after the failure, performing the steps of:

determining whether the recovery log contains the first confirmation record, and only reapplying the first change to the database if the recovery log does not contain the first confirmation record.

9. The computer-readable medium of claim 7, further including instructions for performing the steps of:

generating, after a plurality of other changes have been applied to the copy of data, a plurality of transaction records that specify the plurality of other changes that have been applied to the copy of data, storing the plurality of transaction records in the recovery log, and if the copy of data with the plurality of other changes is stored to a non-volatile storage before the failure, generating a plurality of confirmation records associated with the plurality of confirmation records to indicate that the copy of data with the plurality of other changes was stored to the non-volatile storage before the failure, and storing the plurality of confirmation records in the recovery log.

10. The computer-readable medium of claim 9, further including instructions for, after the failure, performing the steps of:

determining whether the recovery log contains either the first confirmation record or the plurality of confirmation records, only reapplying the first change to the database if the recovery log does not contain the first confirmation record, and only reapplying the plurality of other changes to the database if the recovery log does not contain the plurality of confirmation records.

11. The computer-readable medium of claim 10, wherein the step of reapplying the other changes to the database includes the steps of:

sorting the plurality of transaction records to create a sorted plurality of transaction records, the sorting of the plurality of transaction records being based upon locations in the database where the plurality of other changes are to be reapplied, and reapplying the sorted plurality of other changes to the database.

12. The computer-readable medium of claim 11, wherein:

each of the plurality of transaction records specifies a file identifier and a data block identifier associated with one of the plurality of other changes, and the step of sorting the plurality of transaction records is based upon the file identifiers and data block identifiers specified by the plurality of transaction records.

13. A method for allowing a particular change that has been generated for data to be reapplied to the data after a failure, the method comprising the computer-implemented steps of:

generating, in response to the particular change being generated for the data residing in a volatile storage, first change data that specifies the particular change that has been generated for the data;

storing the first change data to a non-volatile storage; and in response to the first change data being stored to a non-volatile storage before the failure then, performing the steps of generating second change data indicating that the first change data was stored to the non-volatile storage before the failure, and storing the second change data to the non-volatile storage.

14. The method of claim 13, further comprising, after the failure, performing the steps of:

determining whether the non-volatile storage contains the second change data, and only reapplying the particular change to the data if the non-volatile storage does not contain the second change data.

15. The method of claim 13, further comprising the steps of:

generating, after a plurality of other changes have been generated for the data, third change data specifies the plurality of other changes that have been generated for the data, storing the third change data to the non-volatile storage, and if the third change data is stored to a non-volatile storage before the failure then, generating fourth change data indicating that the third change data was stored to the non-volatile storage before the failure, and storing the fourth change data to the non-volatile storage.

16. The method of claim 15, further comprising, after the failure, performing the steps of:

determining whether the non-volatile storage contains either the second change data or the fourth change data, only reapplying the particular change to the data if the non-volatile storage does not contain the second change data, and only reapplying the plurality of other changes to the data if the non-volatile storage does not contain the fourth change data.

17. The method of claim 16, wherein the step of reapplying the other changes to the database includes the steps of:

sorting the third change data to create sorted third change data, the sorting of the plurality of the third change data being based upon locations in the data where the plurality of other changes are to be reapplied, and reapplying the sorted third change data.

18. The method of claim 17, wherein:

the third change data specifies file identifiers and data block identifiers associated with the plurality of other changes, and the step of sorting the third change data is performed based upon the file identifiers and data block identifiers specified by the third change data.

19. A system for allowing a change that was applied to particular data from a database to be reflected in the database after a failure, the system comprising:

a volatile storage containing the particular data with the applied change from the database;

a non-volatile storage having a recovery log stored thereon, wherein the recovery log contains a transaction record that specifies the change that was applied to the particular data, and a confirmation record that indicates that the particular data with the applied change has been stored to the non-volatile storage before a failure.

20. A computer-readable medium for allowing a particular change that has been generated for data to be reapplied to the data after a failure, the computer-readable medium carrying one or more sequences of one or more instructions which, when executed by one or more processors, cause the one or more processors to perform the steps of:

generating, in response to the particular change being generated for the data residing in a volatile storage, first change data that specifies the particular change that has been generated for the data;

storing the first change data to a non-volatile storage; and in response to the first change data being stored to a non-volatile storage before the failure then, performing the steps of generating second change data indicating that the first change data was stored to the non-volatile storage before the failure, and storing the second change data to the non-volatile storage.

21. The computer-readable medium of claim 20, further comprising one or more sequences of one or more instructions which, when executed by the one or more processors, cause the one or more processors to after the failure, perform the steps of:

determining whether the non-volatile storage contains the second change data, and only reapplying the particular change to the data if the non-volatile storage does not contain the second change data.

22. The computer-readable medium of claim 20, further comprising one or more sequences of one or more instructions which, when executed by the one or more processors, cause the one or more processors to perform the steps of:

generating, after a plurality of other changes have been generated for the data, third change data specifies the plurality of other changes that have been generated for the data, storing the third change data to the non-volatile storage, and if the third change data is stored to a non-volatile storage before the failure then,
generating fourth change data indicating that the third change data was stored to the non-volatile storage before the failure, and
storing the fourth change data to the non-volatile storage.

23. The computer-readable medium of claim 22, further comprising one or more sequences of one or more instructions which, when executed by the one or more processors, cause the one or more processors to after the failure, perform the steps of:

determining whether the non-volatile storage contains either the second change data or the fourth change data, only reapplying the particular change to the data if the non-volatile storage does not contain the second change data, and only reapplying the plurality of other changes to the data if the non-volatile storage does not contain the fourth change data.

24. The computer-readable medium of claim 23, wherein the step of reapplying the other changes to the database includes the steps of:

sorting the third change data to create sorted third change data, the sorting of the plurality of the third change data being based upon locations in the data where the plurality of other changes are to be reapplied, and reapplying the sorted third change data.

25. The computer-readable medium of claim 24, wherein:

the third change data specifies file indentifiers and data block identifiers associated with the plurality of other changes, and the step of sorting the third change data is performed based upon the file identifiers and data block identifiers specified by the third change data.

* * * * *

UNITED STATES PATENT AND TRADEMARK OFFICE
CERTIFICATE OF CORRECTION

| | |
|---|---|
| PATENT NO. : 6,292,808 B1 | Page 1 of 1 |
| DATED : September 18, 2001 | |
| INVENTOR(S) : Obermarck et al. | |

It is certified that error appears in the above-identified patent and that said Letters Patent is hereby corrected as shown below:

Title page,
Item [63], please replace "Continuation of application No. 08/768,717, filed Dec. 18, 1996, Now Pat. No. 5,974,425" with -- Continuation of application No. 08/768,717, filed on Dec. 17, 1996, Now Pat. No. 5,974,425 --.

Signed and Sealed this

Twenty-third Day of April, 2002

Attest:

JAMES E. ROGAN
*Director of the United States Patent and Trademark Office*

*Attesting Officer*